(12) United States Patent
Lucas

(10) Patent No.: US 7,921,525 B1
(45) Date of Patent: Apr. 12, 2011

(54) BINDING CLIP WITH SECONDARY ATTACHMENT

(76) Inventor: Richard Lucas, Port Saint Lucie, FL (US)

( * ) Notice: Subject to any disclaimer, the term of this patent is extended or adjusted under 35 U.S.C. 154(b) by 138 days.

(21) Appl. No.: 12/133,338

(22) Filed: Jun. 4, 2008

Related U.S. Application Data

(60) Provisional application No. 60/934,345, filed on Jun. 13, 2007.

(51) Int. Cl.
*A47G 29/00* (2006.01)
(52) U.S. Cl. ............................... 24/306; 24/564; 248/693
(58) Field of Classification Search ................... 24/67.5, 24/67.3, 306, 442, 304, 565; 248/693
See application file for complete search history.

(56) References Cited

U.S. PATENT DOCUMENTS

| | | | | |
|---|---|---|---|---|
| 1,865,453 A * | 7/1932 | Baltzley | ............................ | 24/545 |
| 2,400,058 A * | 5/1946 | Concannon | ...................... | 223/96 |
| 6,341,376 B1 * | 1/2002 | Smerdon, Jr. | ........................ | 2/16 |
| 6,484,322 B2 * | 11/2002 | Christian | ....................... | 2/209.13 |
| 6,834,395 B2 * | 12/2004 | Fuentes | ................................. | 2/69 |
| 7,086,635 B1 * | 8/2006 | Drapeau | ......................... | 248/339 |
| 7,134,231 B1 * | 11/2006 | Becker | ............................ | 40/658 |
| 7,219,405 B1 * | 5/2007 | Nevens | ............................ | 24/464 |
| 7,325,349 B2 * | 2/2008 | Becker | ............................ | 40/658 |
| 7,398,559 B2 * | 7/2008 | Flatt | ...................................... | 2/181 |
| 7,487,897 B1 * | 2/2009 | O'Brien | ......................... | 224/669 |
| 2004/0148740 A1 * | 8/2004 | Arnone | ......................... | 24/11 FE |
| 2005/0244213 A1 * | 11/2005 | Carmen et al. | .................. | 402/19 |
| 2006/0101623 A1 * | 5/2006 | Herley | ............................. | 24/306 |
| 2007/0114351 A1 * | 5/2007 | Mitchell | ..................... | 248/311.2 |
| 2007/0262226 A1 * | 11/2007 | Forgay | ........................... | 248/693 |

* cited by examiner

*Primary Examiner* — Daniel P Stodola
*Assistant Examiner* — Rowland D Do
(74) *Attorney, Agent, or Firm* — Allen D. Hertz

(57) ABSTRACT

An object securing apparatus utilizing a hook and loop material attached to one of two faces of a binder clip and projecting downward there from. The hook and loop material can be single or double sided. A magnetic material can be disposed upon the hook and loop material. The hook and loop material can be cut forming a clearance for rotation of a cantilevered handle of the binder clip. The hook and loop material secures the binder clip to a first object and a binder clip gripping section is used to grip a second object.

17 Claims, 10 Drawing Sheets

BINDING CLIP WITH SECONDARY ATTACHMENT

CROSS-REFERENCE TO RELATED APPLICATION

This Non-Provisional Utility application claims the benefit of co-pending U.S. Provisional Patent Application Ser. No. 60/934,345, filed on Jun. 13, 2007, which is incorporated herein in its entirety.

BACKGROUND OF THE INVENTION

1. Field of the Invention

The present invention relates to an object securing device. More particularly, the incorporation of a dense hook and loop fastening system projecting from an opening portion of a binder clip.

2. Discussion of the Related Art

There are many occasions where a party desires to removably secure an object to another. One example is removably securing a cellular phone onto a person. One known means of securing a cellular phone to a person is via a case. The case can be in many form factors, such as incorporating a two piece, disengaging clip, a holster (wherein the phone is removed from the holster), and the like. A second example is storage of papers. People take notes on papers, then pin the paper to a corkboard. This places holes in the paper; the pins can fall out, dropping the paper; and the like.

Therefore, a universal temporary holding device is desired for holding various objects in a multiplicity of configurations.

SUMMARY OF THE INVENTION

The present invention is generally directed to a binding clip with a secondary securing means, wherein the binding clip secures to a first object and the secondary securing means secures the binding clip to a second object.

In one aspect of the invention, the object securing apparatus comprises:

a "U" shaped contiguous spring metal formed to have a first arm, a second arm and a spring section disposed there between said first arm and said second arm, wherein a distal end of the first arm and a distal end of the second arm contact each other;

a first cantilevered member hingeably coupled to said first arm distal end;

a second cantilevered member hingeably coupled to said second arm distal end; and a dense hook and loop material secured to said second arm, extending outward from said distal end of the second arm.

In another aspect of the invention, the hook and loop is fastened to the second clip arm via an adhesive.

In still another aspect of the invention, the hook and loop is applied in two layers, being fastened to the second clip arm via a thermal bonding process, bonding each of the two layers together.

In yet another aspect of the invention, a cantilever clearance is provided in the outer of the two hook and loop layers, providing clearance for the cantilever to pivot.

In a still further aspect of the invention, an opposing hook and loop material is secured to a second object, wherein the clip hook and loop section and the opposing hook and loop material are removably inter-connectable.

While another aspect of the present invention provides a board having at least one area of opposing hook and loop material.

In another aspect of the invention incorporates a magnetic material onto the hook and loop material.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF REPRESENTATIVE EMBODIMENTS

Shown throughout the Figures, the present invention is generally directed to an object securing apparatus. The object securing apparatus incorporates a dense hook and loop fastening material onto a binding clip.

Figure 1:
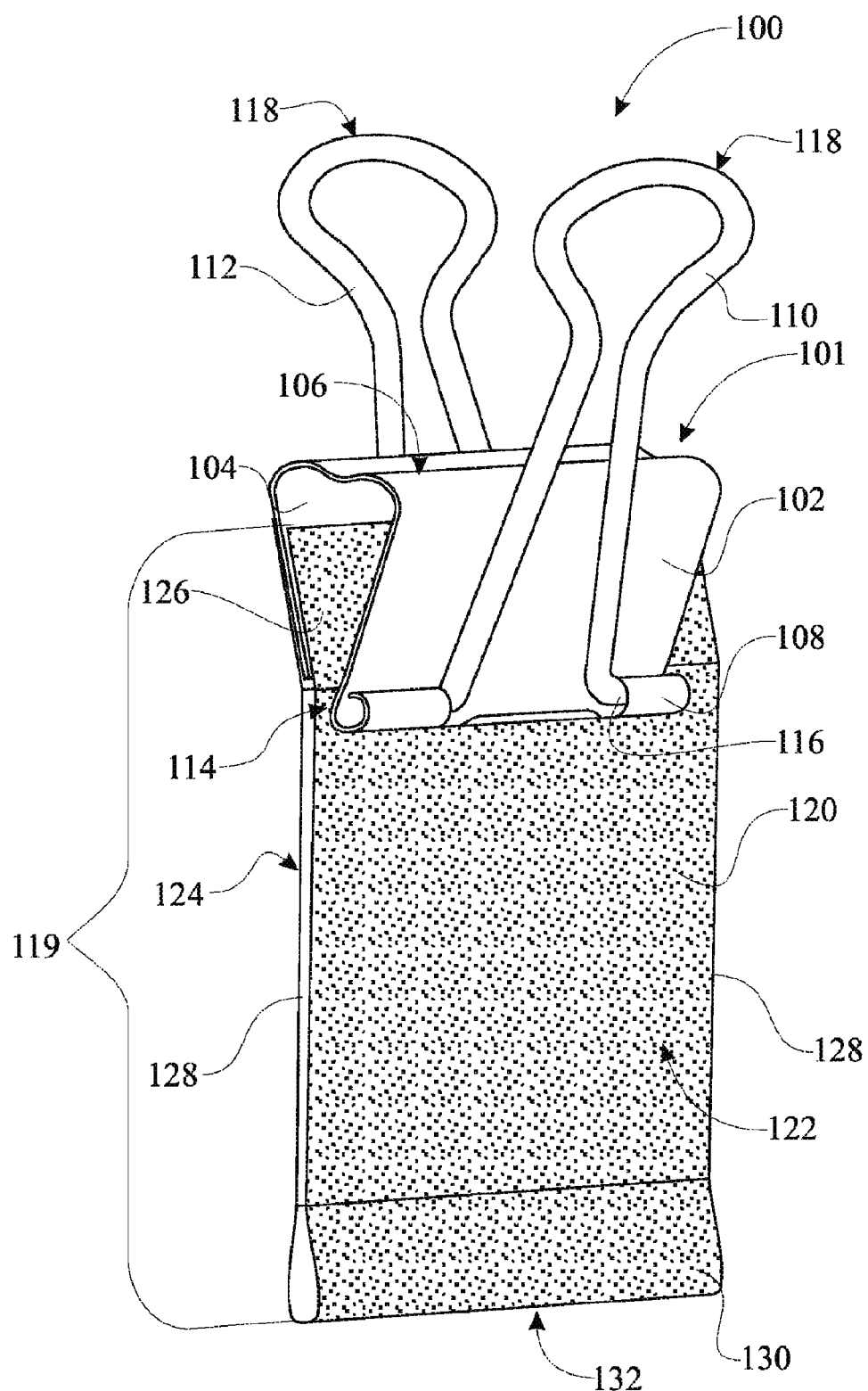
FIG. 1 presents an isometric view of an object securing apparatus in accordance with an exemplary embodiment of the present invention.
Figure 2:
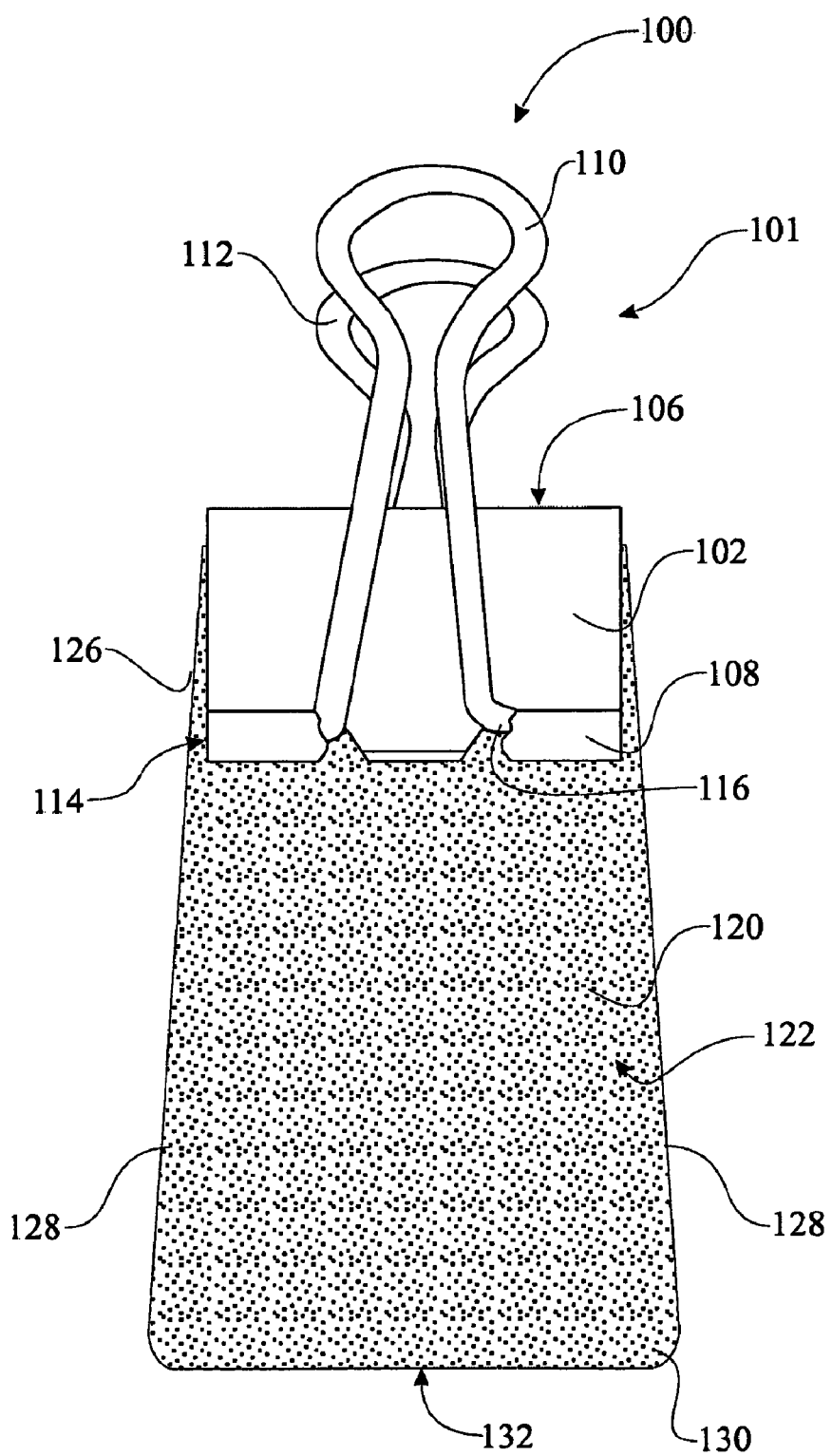
FIG. 2 presents an front elevation view of the object securing apparatus of FIG. 1.
Figure 3:
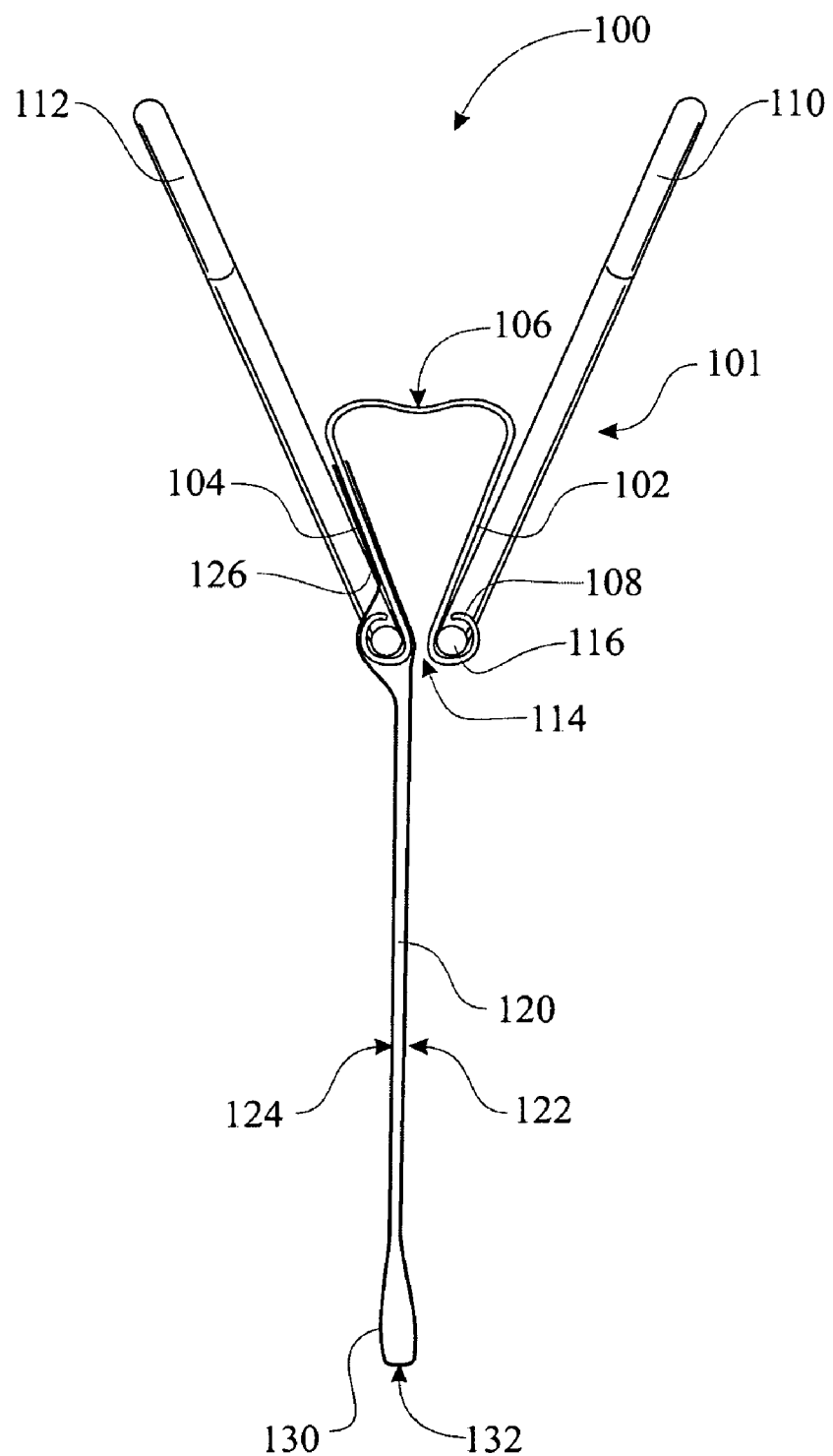
FIG. 3 presents a side elevation view of the object securing apparatus of FIG. 1.
Figure 4:
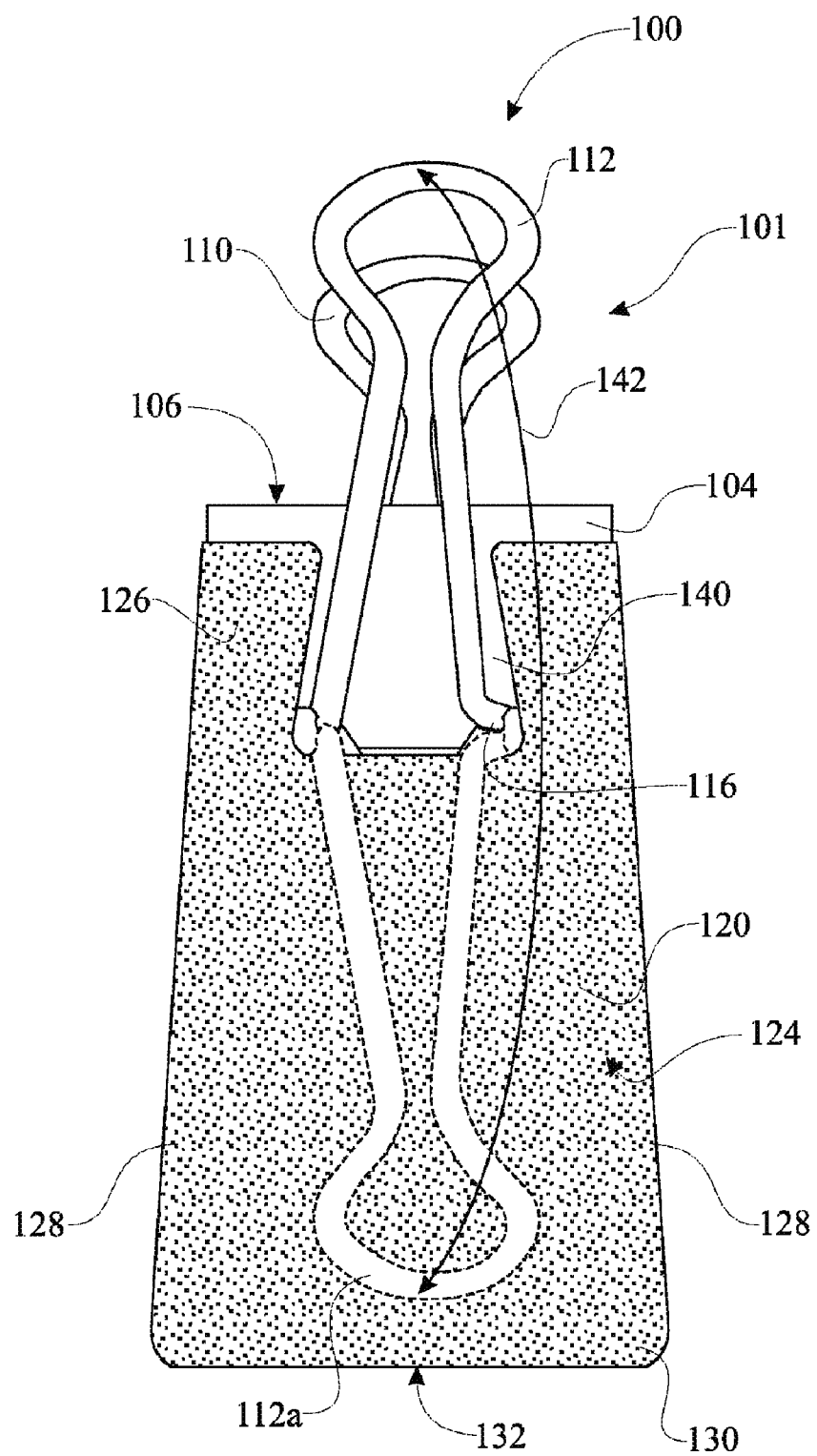
FIG. 4 presents a rear elevation view of the object securing apparatus of FIG. 1.

An item securing binder clip 100 is described in FIGS. 1 through 4. An isometric view of the item securing binder clip 100 is presented in FIG. 1, with a front elevation view being presented in FIG. 2. A side elevation view is illustrated in FIG. 3 with a rear elevation view being shown in FIG. 4. The item securing binder clip 100 can be described having two components: a binder clip member 101 and a hook and loop material 120 section. The binder clip member 101 is fabricated of a contiguous flat spring metal formed having a binder clip first arm 102 and a binder clip second arm 104 with a binder clip spring section 106 disposed there between. The contiguous material preferably having two parallel outer edges. A cantilever hinge section 108 is formed at a distal end of each of the binder clip arms 102, 104, rotationally securing the cantilevered levers 110, 112 being formed about the pivot ends 116 of the levers 110, 112. The cantilevered levers 110, 112 are oriented upward, opposing the binder clip gripping section 114 and providing a fulcrum about the binder clip spring section 106 portion of the contiguous flat spring metal. The user grabs the handle loops 118 formed within the cantilevered levers 110, 112 and compresses the two cantilevered levers 110, 112 to separate the binder clip gripping section 114, providing a clearance for insertion of an object (not shown). When released, the binder clip gripping section 114 closes securing the distal ends of the arms 102, 104 about the object.

An attachment tab 119 in the form of dense hook and loop material 120 is attached to either the binder clip first arm 102 or the binder clip second arm 104, wherein the exemplary embodiment presents the dense hook and loop material 120 being attached to the binder clip second arm 104. In the preferred embodiment, the dense hook and loop material 120 is folded laterally providing a hook and loop first side 122 and an opposing hook and loop second side 124. The fold forms a looped portion 130 proximate a hook and loop distal end 132. The dense hook and loop material 120 projects from the distal end of the binder clip second arm 104 away from the binder clip spring section 106. The dense hook and loop material 120 can be of any length including excessively long, allowing the user to cut the dense hook and loop material 120 to a desired length for use in conjunction with a specific application. The dense hook and loop material 120 is secured to the binder clip second arm 104 via any known method. One exemplary method secures the dense hook and loop material 120 to the binder clip second arm 104 via an adhesive applied there joining the two materials. A second exemplary method secures the dense hook and loop material 120 to the binder clip second arm 104 via heating the dense hook and loop material 120 about each of the two hook and loop material edges 128. The binder clip second arm 104 can be perforate (not shown, but understood by description), providing mechanical integrity to the attachment of the overlap adhered section 126 and the binder clip second arm 104. A third exemplary method secures the dense hook and loop material 120 to the binder clip second arm 104 via stitching the two sides 122, 124 of the dense hook and loop material 120 together. A fourth exemplary method is using mechanical fasteners such as rivets. It is recognized the exemplary securing embodiments can be combined, or other known securing methods can be deployed without deviating from the spirit and intent of the present invention. The dense hook and loop material 120 is normally provided in a pair of coupling form factors: the first being a hook material, the second being a loop material.

An optional cantilever clearance 140 (FIG. 4) can be provided within the hook and loop second side 124 (exterior side), providing clearance for the second cantilever member 112 to rotate in accordance with a cantilever rotation 142 as shown from a cantilevered state to a stored state, ensuring an unencumbered and independent pivotal motion of the second cantilever member. Without the optional cantilever clearance 140, the second cantilever member 112 would remain in a cantilevered state.

Figure 5:
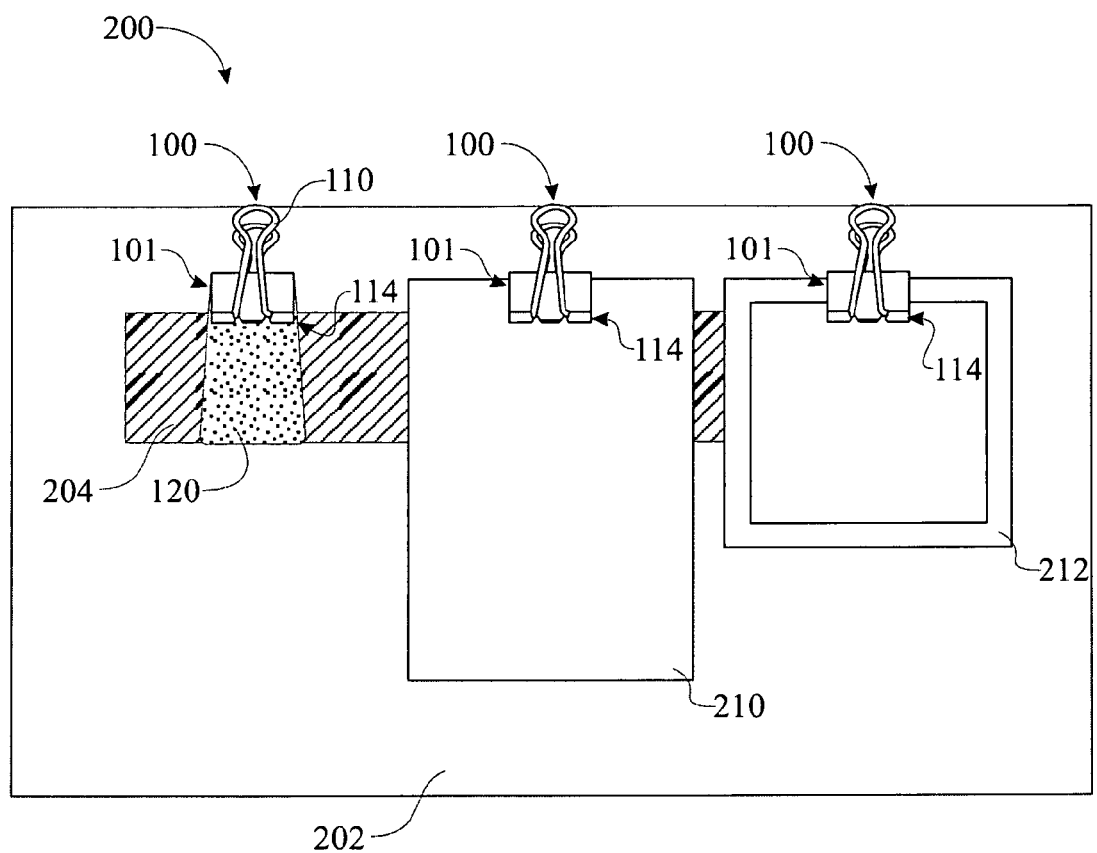
FIG. 5 presents a first exemplary application of the object securing apparatus.

The item securing binder clip 100 can be used in a multitude of applications. Several exemplary embodiments are presented herein, while the number of actual applications is endless. The item securing binder clip 100 can be use to hold an object via either the binder clip gripping section 114 of the binder clip 101 or via the dense hook and loop material 120. A first exemplary embodiment is a vertical plane holding configuration 200, being presented in FIG. 5. The vertical plane holding configuration 200 utilises a vertical plane material 202 having at least one section of mating or opposing hook and loop material 204 disposed thereon. The user would fasten the dense hook and loop material 120 of the item securing binder clip 100 to the opposing hook and loop material 204. Objects such as a planer object 210 and a framed object 212 would be inserted into the binder clip gripping section 114 of the binder clip 101. It is recognized that other objects can be held via the 101 as well, such as three-dimensional objects, and the like. The hook and loop fastening interface has advantages over placing the handle loops 118 over a thumbtack or similar. Thumbtacks leave holes where inserted. Thumbtacks are known to become disengaged, dropping the clip. The hook and loop fastening interface is known to be surprisingly strong. A two inch square piece of the hook and loop fastening interface is enough to support a 175 lb person. If the hook and loop fastening interface is used to bond two rigid surfaces, e.g. auto body panels and frame, the bond is particularly strong because any force pulling the pieces apart is spread evenly across all hooks. Also, any force pushing the pieces together is dis-proportionally applied to engaging more hooks and loops. Vibration can cause rigid pieces to improve their bond.

Figure 6:
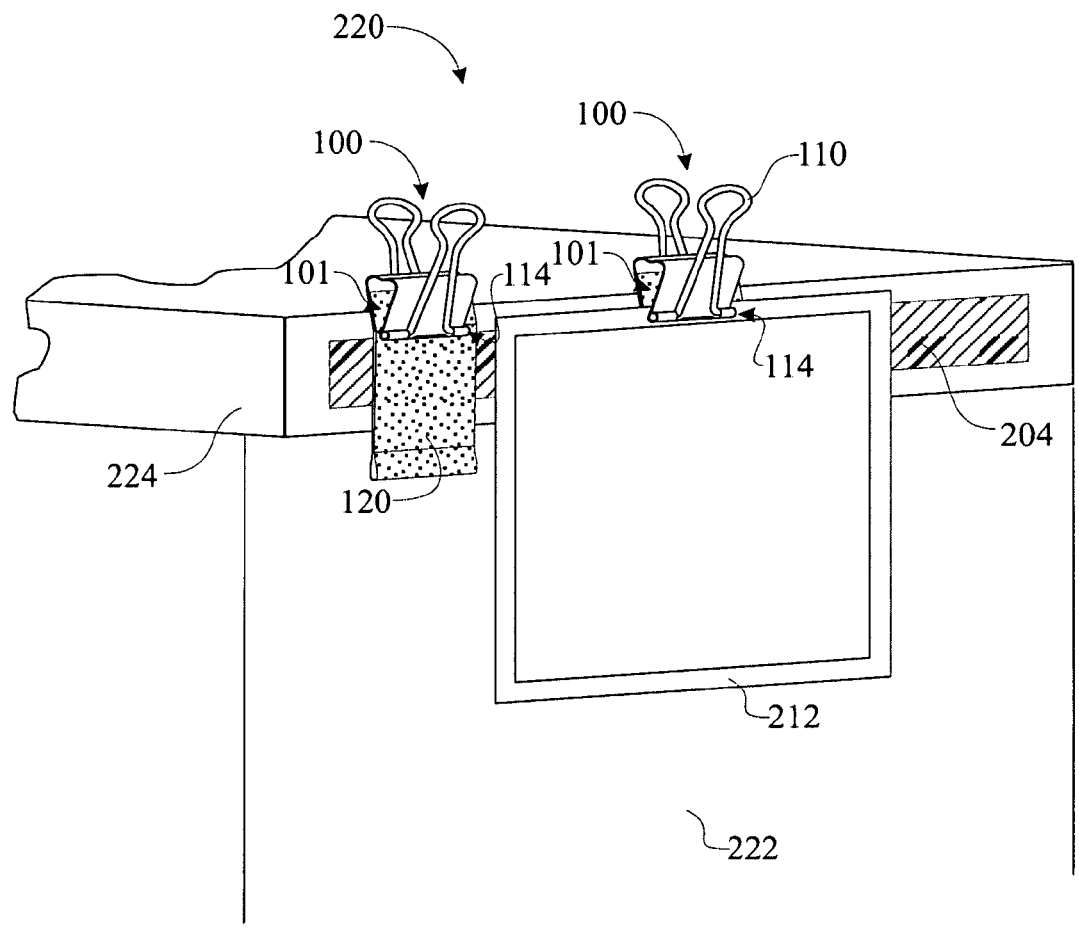
FIG. 6 presents a second exemplary application of the object securing apparatus.

A second exemplary embodiment has the user applying an opposing hook and loop material 204 to an object, such as a countertop 224 (supported via a countertop support member 222) shown in a counter top configuration 220 as illustrated in FIG. 6. The user adheres a section of opposing hook and loop material 204 to a sidewall of the countertop 224 using an adhesive pre-applied to the back of the opposing hook and loop material 204. The user would fasten the dense hook and loop material 120 of the item securing binder clip 100 to the opposing hook and loop material 204, as described in FIG. 5. Objects such as the planer object 210 (similar to FIG. 5), the framed object 212 (as shown), and the like would be inserted into the binder clip gripping section 114 of the binder clip 101.

Figure 7:
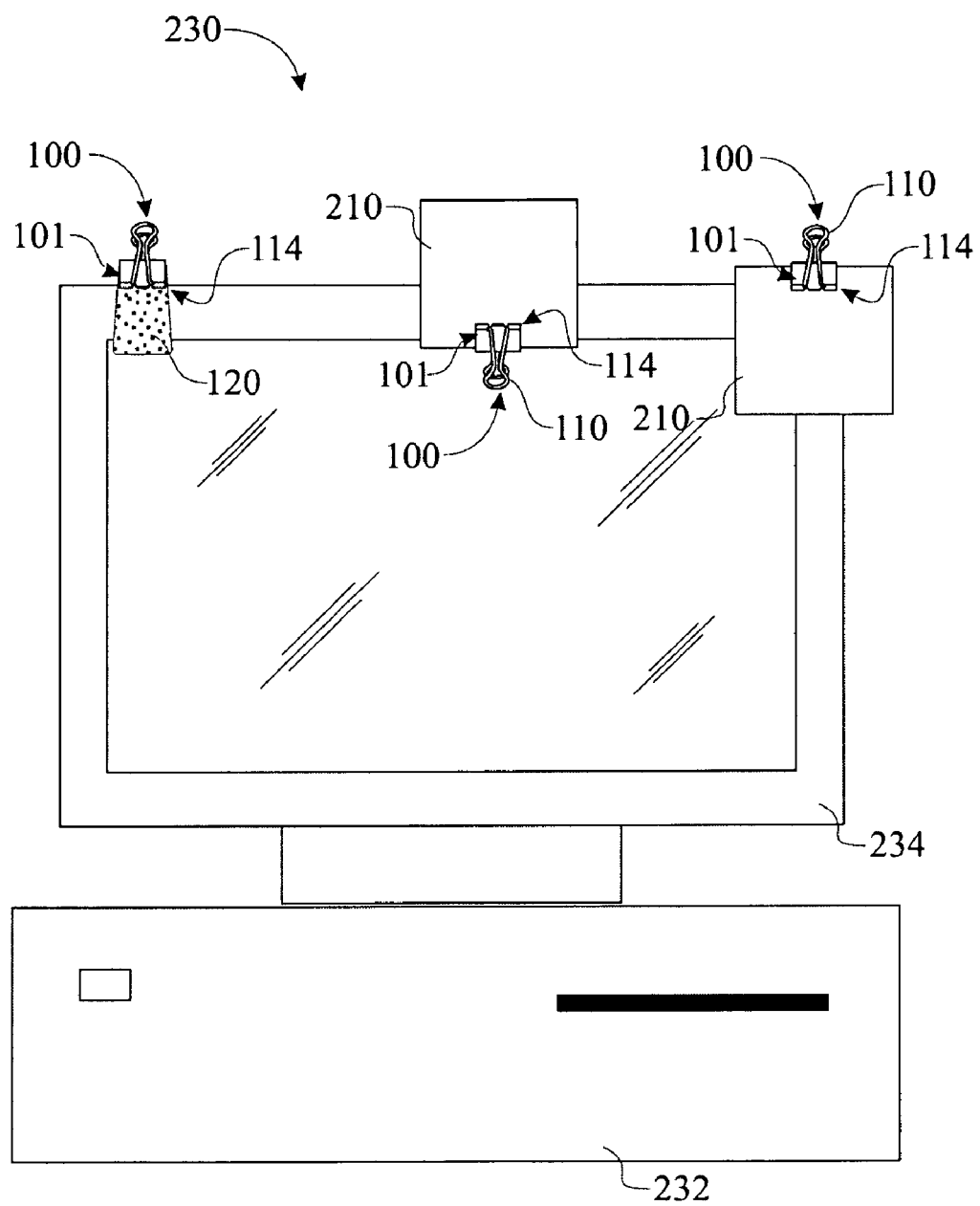
FIG. 7 presents a third exemplary application of the object securing apparatus.
Figure 8:
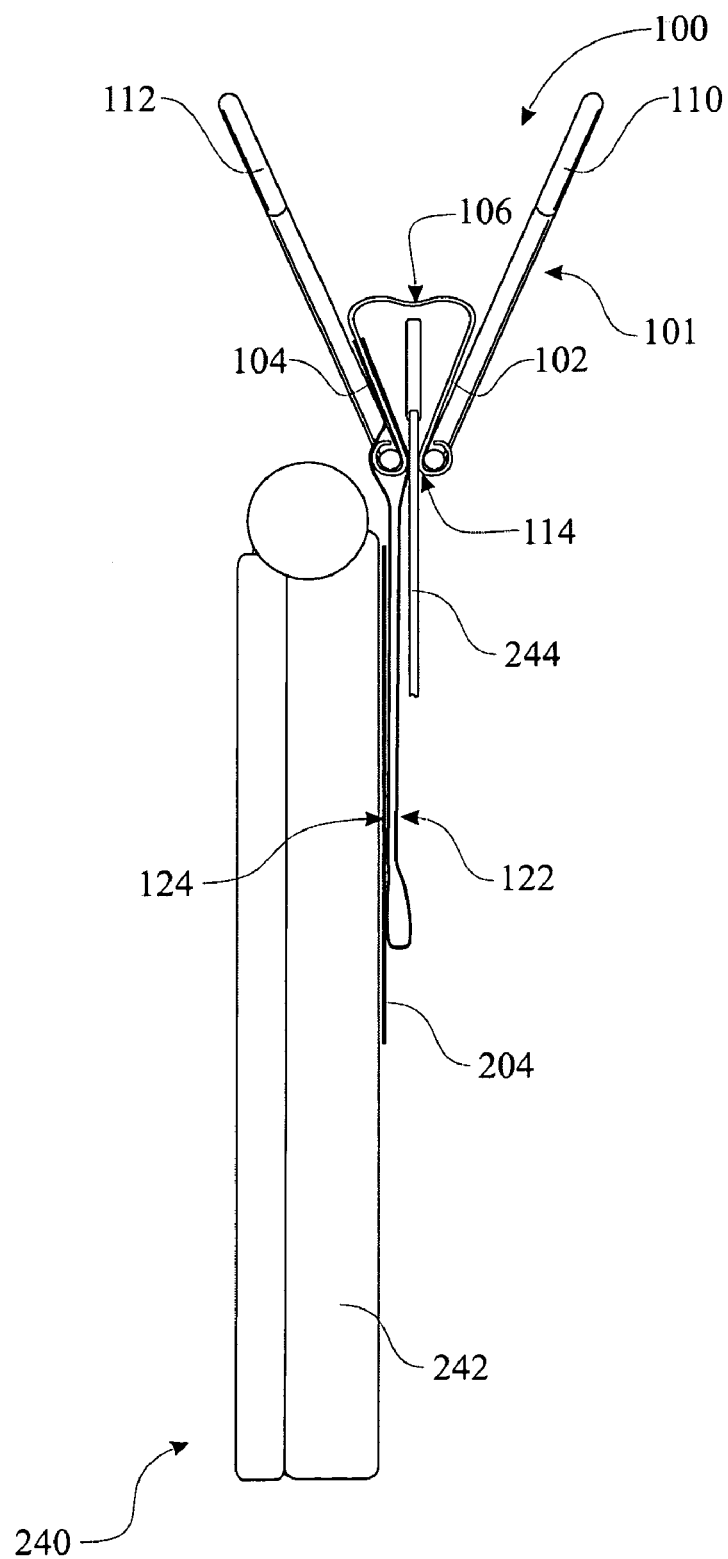
FIG. 8 presents a fourth exemplary application of the object securing apparatus.

A third exemplary embodiment has the user applying an opposing hook and loop material 204 to a three dimensional object, such as a monitor 234 (for a computer 232) of a three dimensional object configuration 230 as illustrated in FIG. 7. The user adheres a section of opposing hook and loop material 204 (located behind the dense hook and loop material 120) to a fascia of the monitor 234 using an adhesive pre-applied to the back of the opposing hook and loop material 204. The user would fasten the dense hook and loop material 120 of the item securing binder clip 100 to the opposing hook and loop material 204, as previously described in FIG. 5. Objects such as the planer object 210 (as shown), the framed object 212 (similar to FIG. 5), and the like would be inserted into the binder clip gripping section 114 of the binder clip 101. The illustration presents that the item securing binder clip 100 can be placed in any orientation.

The previously presented exemplary embodiments teach securing a small object into the binder clip gripping section 114 of the binder clip 101, then securing the item securing binder clip 100 to a larger object via the dense hook and loop material 120. In a fourth exemplary embodiment, a clip on application 240 (illustrated using a three dimensional object 242) is secured to the item securing binder clip 100 by adhering an opposing hook and loop material 204 to the clip on application 240. The opposing hook and loop material 204 is fastened to the hook and loop second side 124 of the item securing binder clip 100. The user then can secure the clip on application 240 as desired via clipping the binder clip 101 onto another object, such as a portion of a pocket 244. The presented embodiment can be used for securing objects such as cellular phones in one's pants or shirt pocket, along the inside of a shirt collar or front, a seat belt, and the like. By utilizing a hook and loop closure material, the item securing binder clip 100 can be used for securing a variety of objects of various shapes with minimal cost.

Figure 9:
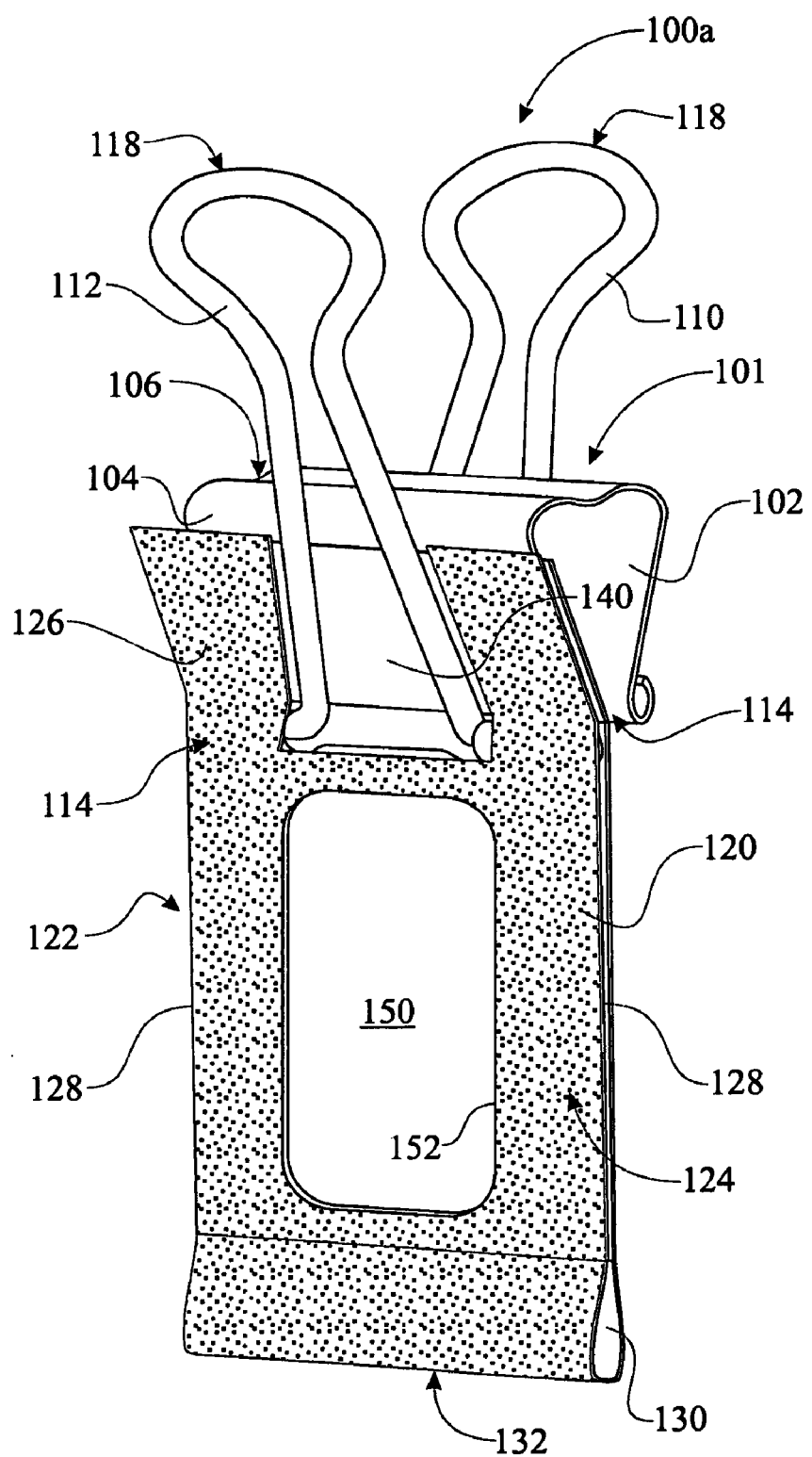
FIG. 9 presents a rear isometric view of the object securing apparatus of FIG. 1, enhanced with an optional magnetic member.
Figure 10:
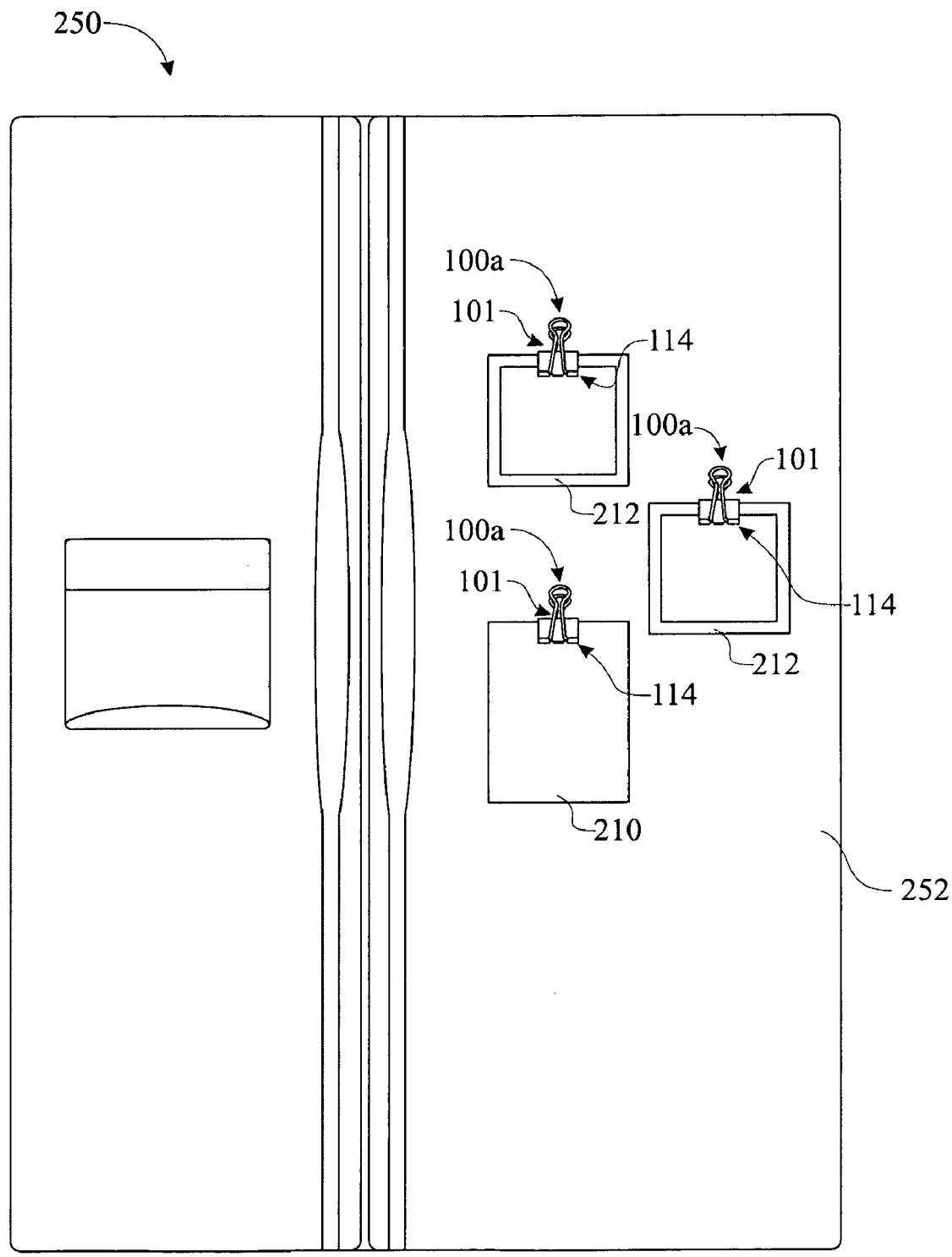
FIG. 10 presents a fifth exemplary application of the object securing apparatus.

An item securing binder clip 100a is an enhanced version of the item securing binder clip 100 with the additional features best presented in FIG. 9. The item securing binder clip 100a includes the features of the item securing binder clip 100 with the addition of a magnetic member 150. The magnetic member 150 is disposed upon the dense hook and loop material 120, with one embodiment assembling the magnetic member 150 between the hook and loop first side 122 and the hook and loop second side 124. The magnetic member 150 can be exposed through a cutout 152 or hidden. The magnetic member 150 can be of a rigid or a flexible magnetic material. The magnetic member 150 can also replace the dense hook and loop material 120. The item securing binder clip 100a provides the additional ability to secure an object a magnetic object, as represented in the exemplary embodiment of a magnetic securing configuration 250 shown in FIG. 10. A plurality of item securing binder clips 100a is magnetically attached to a magnetic surface 252 (such as a refrigerator door as shown) via the magnetic member 150. Objects 210, 212 can be secured within the binder clip gripping section 114 of the binder clip 101. It is recognized that the item securing binder clip 100a can be attached to any magnetic object via the magnetic member 150 or any non-magnetic object via the hook and loop material interface 120, 204. Additional examples include dashboards, lights, toolboxes, and the like. It is also recognized that other connecting materials, such as a material comprising an adhesive, can be used on place of the hook and loop or magnetic material, while maintaining the spirit and intent of the present invention.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

I claim:

1. An object securing apparatus, the apparatus comprising:
   a binder clip having a "U" shaped spring section, a first arm being contiguous and extending from a first end of the spring section, and a second arm being contiguous and extending from a second end of the spring section, wherein a first arm distal end of the first arm and a second arm distal end of the second arm meet at a binder clip gripping section providing a gripping force;
   a first cantilevered member hingeably coupled to the first arm distal end;
   a second cantilevered member hingeably coupled to the second arm distal end;
   an attachment tab comprising a dense hook and loop material, the attachment tab being secured to the second arm, originating at a location along the second arm, across the second arm distal end, and extending outward from the distal end of the second arm, the attachment tab oriented with a mating surface exposed; and
   a cantilever clearance provided in the attachment tab, the clearance being shaped around the second cantilevered member wherein the attachment tab is detached from the second cantilevered member, ensuring an unencumbered and independent pivotal motion of the second cantilevered member.

2. An object securing apparatus as recited in claim 1, the apparatus further comprising:
   a magnetic material disposed upon the dense hook and loop material.

3. An object securing apparatus as recited in claim 1, wherein the mating surface is provided on both a first and a second side of the attachment tab.

4. An object securing apparatus as recited in claim 1, further comprising a second hook and loop material section, the second hook and loop material section comprising an opposing of the two mating surfaces of the dense hook and loop material.

5. An object securing apparatus as recited in claim 1, further comprising an adhesive for securing the hook and loop material to the second arm.

6. An object securing apparatus as recited in claim 1, wherein the attachment tab is an assembly comprising a first section of the hook and loop material positioned on a first side of the second arm and a second section of the hook and loop material positioned on a second side of the second arm, wherein the first section of the hook and loop material and the second section of the hook and loop material are heat staked together along edges of the hook and loop material.

7. An object securing apparatus as recited in claim 1, further comprising a mechanical interface securing the hook and loop material to the second arm.

8. An object securing apparatus, the apparatus comprising:
   a binder clip having a "U" shaped spring section, a first wall being contiguous and extending from a first end of the spring section, and a second wall being contiguous and extending from a second end of the spring section, wherein a first arm distal end of the first wall and a second arm distal end of the second wall meet at a binder clip gripping section providing a gripping force;
   a first cantilevered member hingeably coupled to the first arm distal end;
   a second cantilevered member hingeably coupled to the second arm distal end;
   an attachment tab comprising a planar connecting material originating at a location along the second wall, across the second arm distal end, and extending outward from the distal end of the second arm, the planar connecting material having properties for removably connecting to a mating material; and
   a cantilever clearance provided in the attachment tab, the clearance being shaped around the second cantilevered member wherein the attachment tab is detached from the second cantilevered member, ensuring an unencumbered and independent pivotal motion of the second cantilevered member.

9. An object securing apparatus as recited in claim 8, wherein the planar connecting material is of at least one of a hook and loop material and a magnetic material.

10. An object securing apparatus as recited in claim 9, further comprising a mating material section, the mating material section comprising a mate to the planar connecting material, the mating material comprising an adhesive on a non-mating side.

11. An object securing apparatus as recited in claim 8, wherein the planar connecting material is a hook and loop material, and
   a magnetic material disposed upon the dense hook and loop material.

12. An object securing apparatus as recited in claim 8, wherein the planar connecting material is a hook and loop material and wherein the dense hook and loop material is provided having a connecting interface side on at least one of:
   a) an external side of the extending portion, and
   b) both a first and a second side of the extending portion.

13. An object securing apparatus, the apparatus comprising:
   a binder clip having a "U" shaped spring section, a first wall being contiguous and extending from a first end of the spring section, and a second wall being contiguous and extending from a second end of the spring section, wherein a first arm distal end of the first wall and a second arm distal end of the second wall meet at a binder clip gripping section providing a gripping force;
a first cantilevered member hingeably coupled to the first arm distal end;
a second cantilevered member hingeably coupled to the second arm distal end;
an attachment tab comprising a dense hook and loop material is secured to the second arm, originating at a location along the second wall, across the second arm distal end, and extending outward from the distal end of the second arm, wherein a hook and loop interface surface side of the dense hook and loop material is oriented in accordance with a side of the second arm that is defined by the outside of the "U" shape; and
a cantilever clearance provided in the attachment tab, the clearance being shaped around the second cantilevered member wherein the attachment tab is detached from the second cantilevered member, ensuring an unencumbered and independent pivotal motion of the second cantilevered member.

14. An object securing apparatus as recited in claim 13, the apparatus further comprising:
a magnetic material disposed upon the dense hook and loop material.

15. An object securing apparatus as recited in claim 13, further comprising a second hook and loop material section, the second hook and loop material section being a mating portion to the dense hook and loop material secured to the second arm.

16. An object securing apparatus as recited in claim 13, wherein the second hook and loop material section includes an adhesive applied to a non-mating side.

17. An object securing apparatus as recited in claim 13, wherein the attachment tab is secured to the second arm via at least one of:
a. an adhesive;
b. heat staking; and
c. a mechanical fastener.

* * * * *